US007627238B2

(12) United States Patent
Osaka et al.

(10) Patent No.: US 7,627,238 B2
(45) Date of Patent: Dec. 1, 2009

(54) CAMERA MODULE

(75) Inventors: Tomohiko Osaka, Yamagata (JP); Takashi Ishizawa, Yamagata (JP)

(73) Assignee: Mitsumi Electric Co., Ltd. (JP)

( * ) Notice: Subject to any disclaimer, the term of this patent is extended or adjusted under 35 U.S.C. 154(b) by 86 days.

(21) Appl. No.: 11/928,367

(22) Filed: Oct. 30, 2007

(65) Prior Publication Data
US 2008/0297899 A1 Dec. 4, 2008

(30) Foreign Application Priority Data
Oct. 30, 2006 (JP) .............................. 2006-294303

(51) Int. Cl.
*G03B 17/00* (2006.01)
(52) U.S. Cl. ...................... 396/85; 396/439; 359/507
(58) Field of Classification Search .................. 396/85, 396/439; 359/507, 511
See application file for complete search history.

(56) References Cited

U.S. PATENT DOCUMENTS

| 7,499,639 | B2 * | 3/2009 | Kawai | 396/111 |
| 2004/0047625 | A1 * | 3/2004 | Ito et al. | 396/429 |
| 2006/0203627 | A1 | 9/2006 | Osaka | |
| 2007/0212058 | A1 * | 9/2007 | Kawai | 396/429 |
| 2007/0229702 | A1 * | 10/2007 | Shirono et al. | 348/374 |
| 2008/0013945 | A1 * | 1/2008 | Takizawa et al. | 396/439 |

FOREIGN PATENT DOCUMENTS

| JP | 2003244976 A | 8/2003 |
| JP | 2004280031 A | 10/2004 |
| WO | WO 2006043456 A | 4/2006 |

* cited by examiner

*Primary Examiner*—W B Perkey
*Assistant Examiner*—Warren K Fenwick
(74) *Attorney, Agent, or Firm*—Marger Johnson & McCollom, P.C.

(57) ABSTRACT

A camera module that can obtain a clear image even in the case where dust is generated inside the camera module due to a shock applied thereto is provided. The camera module includes a base and a cover attached to the base so as to define a space therebetween in which the holder can be displaced. The base has an upper surface which faces the cover, and the upper surface of the base includes a concaved dust collecting portion and a dust falling preventing wall formed on the upper surface so as to surround an entire circumference of an opening of the base, and wherein a surface of the concaved dust collecting portion includes a dust sticking layer to which fallen dust is adapted to stick, whereby when dust is generated in the space between the cover and the base and such dust is fallen onto the upper surface of the base, it is possible to prevent such dust from entering into the opening by the dust falling preventing wall and such dust is stuck to the dust sticking layer of the dust collecting portion provided on the upper surface of the base.

2 Claims, 4 Drawing Sheets

CAMERA MODULE

BACKGROUND OF THE INVENTION

1. Field of the Invention

This invention relates to a camera module, and more specifically to a camera module that can be used in small-sized electronic apparatuses such as digital cameras, camera-equipped cellular phones and the like.

2. Description of the Related Art

A camera module having a function of displacing a lens unit in a direction of an optical axis of the lens unit is used in relatively small-sized digital cameras, camera-equipped cellular phones and the like. This function is used for providing an autofocus function and/or zoom function and the like, and is achieved by an interaction between a magnetic field generated by an electrical current flowing in a coil and a magnetic field generated by a yoke and magnets provided on the yoke.

Such a camera module generally includes a barrel which holds the lens unit, a holder which houses the barrel therein, and a pair of leaf springs for supporting the holder so that the holder is displaceable in a direction of an optical axis of the lens unit.

FIG. 3 is an exploded perspective view of an autofocus actuator assembly 100 used in a conventional camera module for displacing a lens unit (not shown) in a direction of an optical axis thereof. It is to be noted that an imaging element (not shown) is provided below a base 111 of the actuator assembly 100.

A holder 108 that houses a barrel (not shown) holding the lens unit is provided in a space between a cover 101 and the base 111 so that the holder 108 is displaceable in a direction of an optical axis of the lens unit together with the lens unit.

An inner annular portion 104b of an upper leaf spring 104 and an inner annular portion 110b of a lower leaf spring 110 are attached to upper and lower cylindrical end portions of the holder 108, respectively, using an adhesive. Further, an outer annular portion 104a of the upper leaf spring 104 is attached to a top surface of a yoke 105 and an outer annular portion 110a of the lower leaf spring 110 is provided on a lower end of the yoke 105, respectively. Furthermore, on the upper surface of the inner annular portion 104b of the upper spring 104 which is attached to the upper cylindrical end portion of the holder 108, a stopper denoted by the reference numeral 102 is attached using an adhesive.

Three bridge portions 104c are coupled between the outer annular portion 104a and the inner annular portion 104b of the upper leaf spring 104. As is the same with the upper leaf spring 104, three bridge portions 110c are coupled between the outer annular portion 110a and the inner annular portion 110b of the upper leaf spring 110. By resilient deformation of the respective three bridge portions 104c and 110c, the holder 108 can be displaced in a direction of an optical axis of the lens unit.

A plurality of magnets 106 are provided on the yoke 105 so as to produce a magnetic field. The yoke 105 has an axial bore 105a for receiving the holder 108. Further, a coil 107 is provided around an outer periphery of a cylindrical portion of the holder 108 so that the coil 7 is disposed in the magnetic field produced by the magnets 106 and the yoke 105 in a state that the holder 108 is received in the axial bore 105a. By supplying a current to the coil 107 to generate a magnetic field, the holder 108 can be displaced in a direction of an optical axis of the lens unit by a driving force generated by the interaction of the magnetic fields. In this regard, it is to be noted that a component donated by the reference numeral 109 in FIG. 3 is a ring-shaped plate provided between the lower leaf spring 110 and the lower end of the yoke 105. Further, a flexible printed circuit board 103 for supplying an electrical current to the coil 107 is provided below the outer annular portion 110a of the lower leaf spring 110.

As shown in FIG. 4, the base 111 has a base upper surface 111c having an opening 111a at a center thereof defined by an edge 111b, and the base upper surface 111c is formed into a flat surface continued to the edge 111b.

In the actuator assembly 100 described above, the components such as the cover 101, the stopper 102, the holder 108 and the base 111 are molded parts made of synthetic resins containing glass filler as aggregate.

It is to be noted that an actuator assembly similar to the actuator assembly 100 described above is disclosed in JP-A-No. 2004-280031.

As described above, the actuator assembly 100 includes the components such as the cover 101, the stopper 102, the holder 108 and the base 111 which are made of synthetic resins containing glass filler as aggregate. Therefore, when the small-sized electronic apparatuses equipped with the camera module is dropped by an accident, there is a case that dust which is formed from glass filler or synthetic resins chipped from the molded parts is generated. If such dust is generated, there is a case that such dust is fallen onto the base upper surface 111c of the base 111, then fallen into the opening 111a over the edge 111b, and finally fallen onto a surface of an upper lid glass (not shown) disposed in an imaging area including the imaging element. If such dust is fallen onto the surface of the lid glass and adheres thereto, there arises a problem in that burred dots appear on an image obtained by the camera module.

SUMMARY OF THE INVENTION

The present invention has been made in view of the problem described above, and therefore it is an object of the present invention to provide a camera module that can obtain a clear image even in the case where dust is generated inside the camera module due to a shock applied thereto.

In order to achieve the object, the present invention is directed to a camera module, which comprises: a lens unit which constitutes an optical system of the camera module; a holder which has a hollow cylindrical portion that houses the lens unit therein and is displaceable along an optical axis direction of the lens unit; a coil having a cylindrical form and provided around the cylindrical portion of the holder; a yoke and magnets provided on the yoke for providing a magnetic field to the coil; upper and lower leaf springs for supporting the holder so that the holder is displaceable along an optical axis direction of the lens unit; a base which supports the yoke, and has an opening at a center thereof; a cover attached to the base so as to define a space therebetween in which the holder 8 can be displaced; and an imaging element provided below the base. The base has an upper surface which faces the cover, and the upper surface of the base includes a concaved dust collecting portion and a dust falling preventing wall formed on the upper surface so as to surround an entire circumference of the opening of the base, and wherein a surface of the concaved dust collecting portion includes a dust sticking layer to which fallen dust is adapted to stick, whereby when dust is generated in the space between the cover and the base and such dust is fallen onto the upper surface of the base, it is possible to prevent such dust from entering (falling) into the opening by the dust falling preventing wall and such dust is stuck to the dust sticking layer of the dust collecting portion provided on the upper surface of the base.

According to the camera module of the present invention having the above structure, when the small-sized electronic apparatuses equipped with the camera module is dropped by an accident, and thereby dust is generated inside the space between the cover and the base, there is less possibility that such dust falls on the surface of an upper lid glass disposed in an imaging area of the imaging element. This is because when such dust generated inside the space is fallen onto the upper surface of the base, it is possible to prevent such dust from being fallen into the opening due to the dust falling preventing wall, and further such dust is stuck to the dust sticking layer provided on the surface of the concaved dust collecting portion. Therefore, even in the event that the small-sized electronic apparatuses equipped with the camera module is dropped by an accident and thus dust is generated inside the camera module, it is possible to obtain a clear image.

In the camera module of the present invention, it is preferred that the dust sticking layer of the dust collecting portion provided in the upper surface of the base includes a thin layer made of an epoxy-based resin or an acryl-based resin.

According to the camera module of the present invention having the above structure, it is possible to collect such dust fallen onto the upper surface of the base by the dust collecting portion reliably, thereby enabling to prevent such dust from being fallen into the opening of the base.

The above and other objects, features and advantages of the present invention will be apparent from the following description when taken in conjunction with the accompanying drawings which illustrate a preferred embodiment of the present invention by way of example.

DETAILED DESCRIPTION OF THE PREFERRED EMBODIMENT

Figure 1:
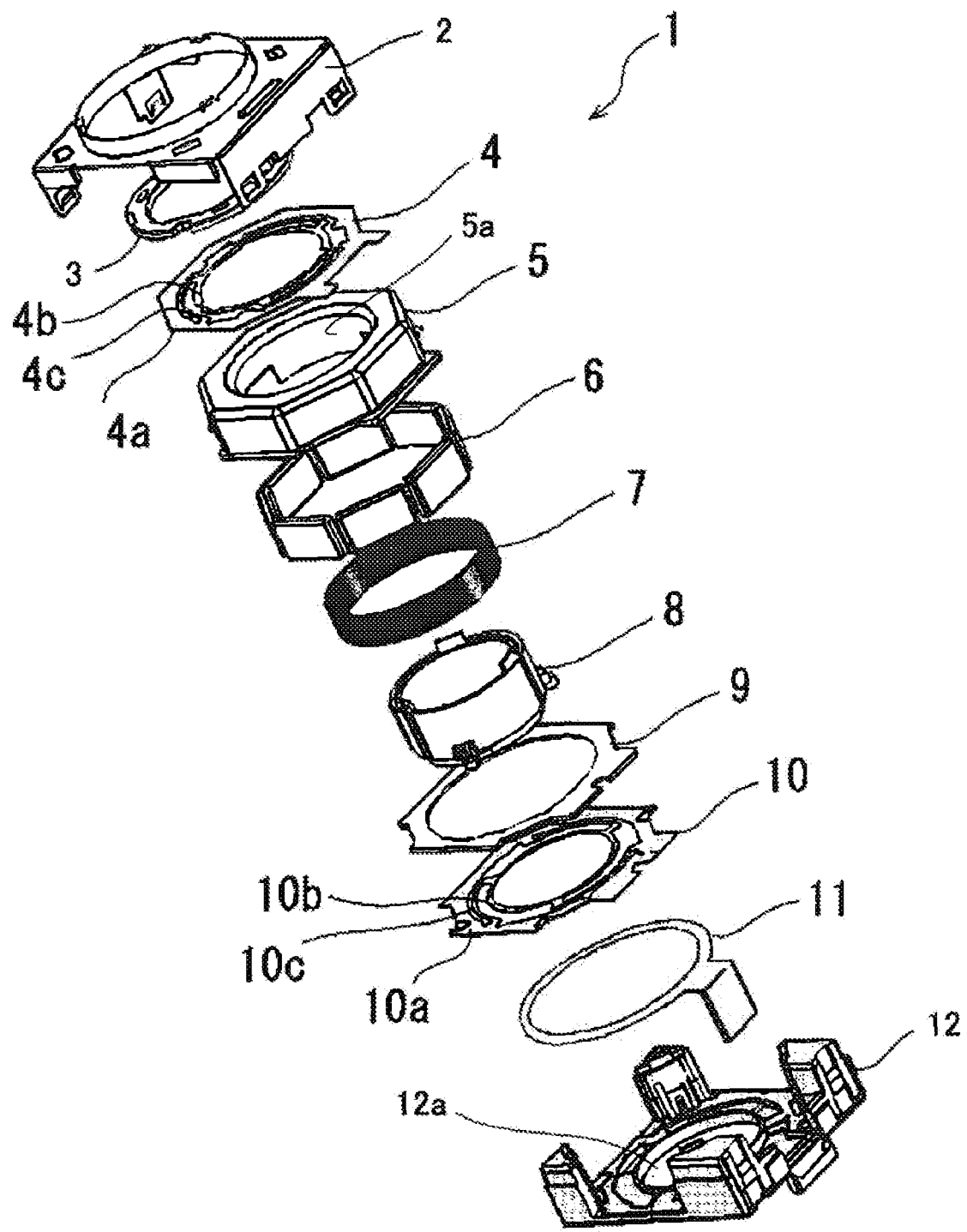
FIG. 1 is an exploded perspective view of an actuator assembly 1 of a camera module of an embodiment according to the present invention.

A camera module according to an embodiment of the present invention will be described below with reference to the accompanying drawing.

The camera module according to this embodiment comprises: a lens unit (not shown) which constitutes an optical system of the camera module; a holder 8 which has a hollow cylindrical portion that houses the lens unit therein and is displaceable along an optical axis direction of the lens unit; a coil 7 having a cylindrical form and provided around the cylindrical portion of the holder 8; a yoke 5 and magnets 6 provided on the yoke 5 for providing a magnetic field to the coil; upper and lower leaf springs 4, 10 for supporting the holder 8 so that the holder 8 is displaceable along an optical axis direction of the lens unit; a base 12 which supports the yoke and has an opening 12a at a center thereof; a cover 2 attached to the base 12 so as to define a space therebetween in which the holder 8 can be displaced; and an imaging element (not shown) provided below the base 12, wherein the camera module is characterized in that the base 12 has an upper surface which faces the cover 2, and the upper surface of the base 12 includes a concaved dust collecting portion 12c and a dust falling preventing wall 12b formed on the upper surface so as to surround an entire circumference of the opening 12a of the base 12, and wherein a surface of the concaved dust collecting portion 12c includes a dust sticking layer 12d to which fallen dust is adapted to stick, whereby when dust is generated in the space between the cover 2 and the base 12 and such dust falls onto the upper surface of the base 12, it is possible to prevent such dust from entering into the opening 12c by the dust falling preventing wall 12b and such dust is adapted to stick to the dust sticking layer 12d of the dust collecting portion 12c provided on the upper surface of the base 12.

Hereinbelow, with reference to FIG. 1, a description is made with regard to an actuator assembly 1 of the camera module of the embodiment according to the present invention in more details.

In a space defined between the cover 2 and the base 12, the holder 8 which houses a barrel (not shown) holding the lens unit is provided so as to be displaceable in an optical axis direction of the lens unit.

The holder 8 is a cylindrical member made of a synthetic resin which contains glass filler as aggregate and the coil 7 is provided around the cylindrical portion of the holder 8. An inner annular portion 4b of the upper leaf spring 4 is attached an upper cylindrical end portion of the holder 8 and an inner annular portion 10b of the lower leaf spring 10 is attached to a lower cylindrical end portion of the holder 8, respectively. Further, an outer annular portion 4a of the upper leaf spring 4 is attached to a top surface of the yoke 5 provided on the base 12 and an outer annular portion 10a of the lower leaf spring 10 is attached to a lower end portion of the yoke 5 through an annular plate 19. Furthermore, on the upper surface of the inner annular portion 4b of the upper spring 4 which is attached to the upper cylindrical end portion of the holder 8, a stopper 3 is attached using an adhesive. This stopper 3 is also formed of a synthetic resin containing glass filler as aggregate, and it is provided for restricting upwardly excessive displacement of the holder 8 by the abutment with the bottom surface of the cover 2 when the holder 8 is largely displaced.

Each of the upper and lower leaf springs 4, 10 is formed from a thin metal plate made of beryllium copper through a punching process so as to have the outer annular portion 4a, 10a and the inner annular portion 4b, 10b which is concentrically provided inside the outer annular portion 4a, 10a through an annular spacing. In each of the upper and lower leaf springs 4, 10, the inner annular portion 4b, 10b is displaceably supported by the outer annular portion 4a, 10a through the three bridge portions 4c, 10c. Each of the bridge portions 4c, 10c has an elongated arc-shape which extends along the inner periphery of the outer annular portion 4a, 10a and the outer periphery of the inner annular portion 4b, 10b in the space through a predetermined angle. By resilient deformation of the respective three bridge portions 4c and 10c, the holder 8 can be displaced in a direction of an optical axis of the lens unit.

The plurality of magnets 6 are bonded to the inner surface of the yoke 5 so as to produce a magnetic field. Further, the coil 7 is provided around an outer periphery of the cylindrical portion of the holder 8 so that the coil 7 is disposed in the magnetic field generated by the magnets 6 and the yoke 5. The yoke 5 has an axial bore 5a for receiving the holder 8. The holder 8 can be displaced through the axial bore 5a in a direction of an optical axis of the lens unit by supplying an electrical current to the coil 7. Further, the annular plate 9 made of a magnetic metal material is provided between the lower leaf spring 10 and the bottom surface of the yoke 5 for reducing leakage of magnetic fluxes from the magnets 6. In this regard, it is to be noted that a component denoted by the reference numeral 11 is a flexible printed circuit board used for supplying a current to the coil 7.

Figure 2:
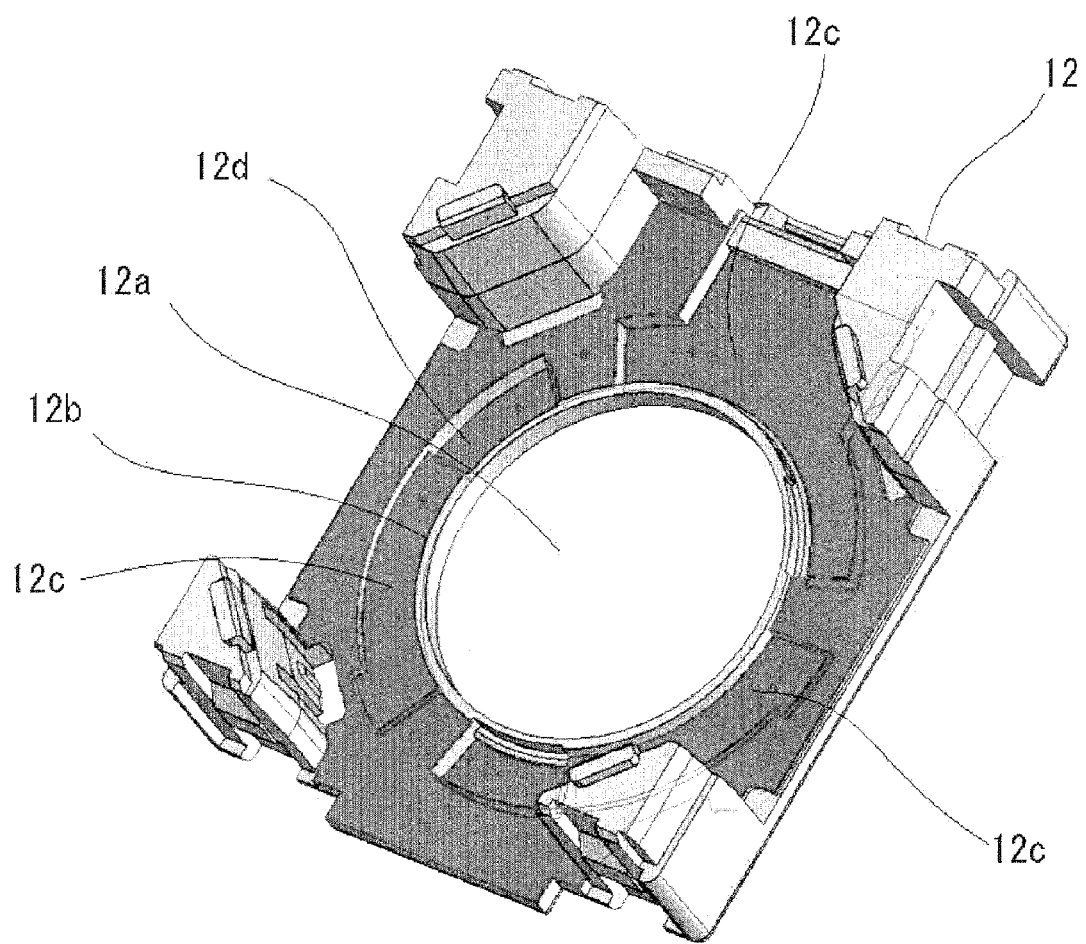
FIG. 2 is an enlarged perspective view of a base 12 of the camera module shown in FIG. 1.
Figure 3:
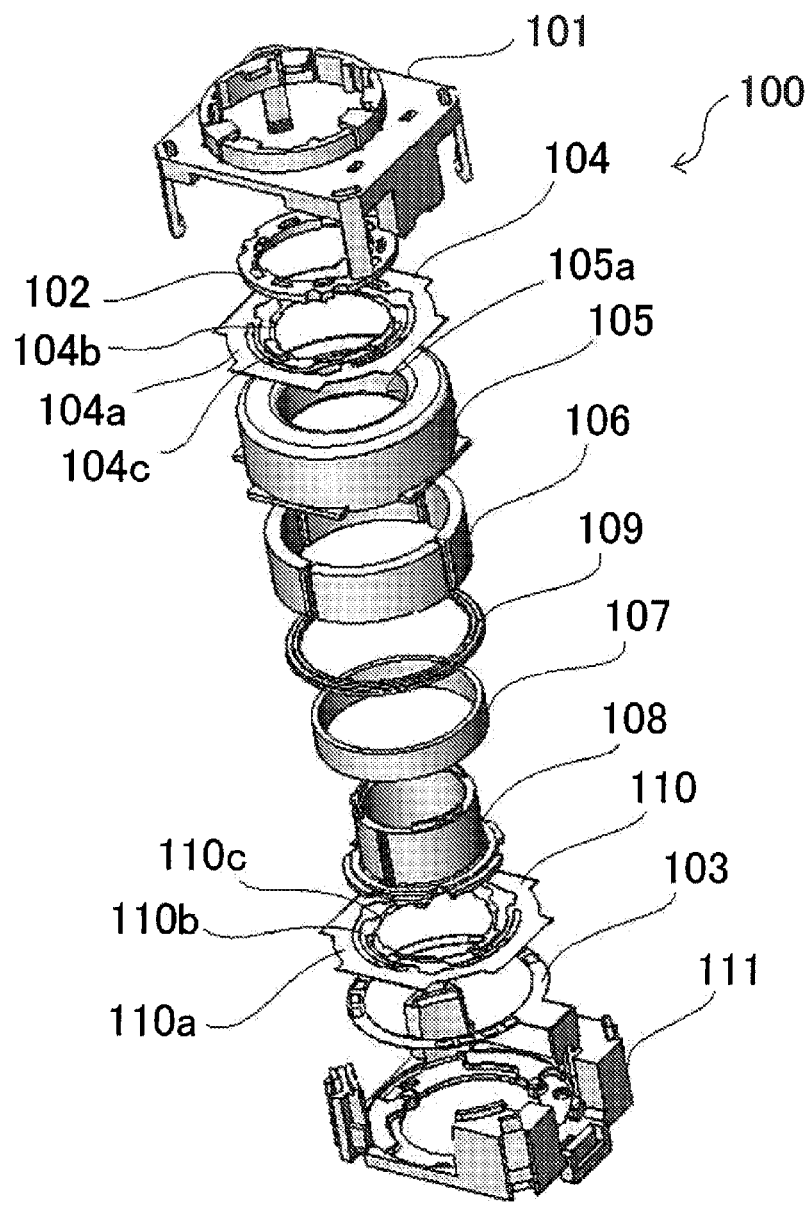
FIG. 3 is an exploded perspective view of an actuator assembly 100 of a conventional camera module.
Figure 4:
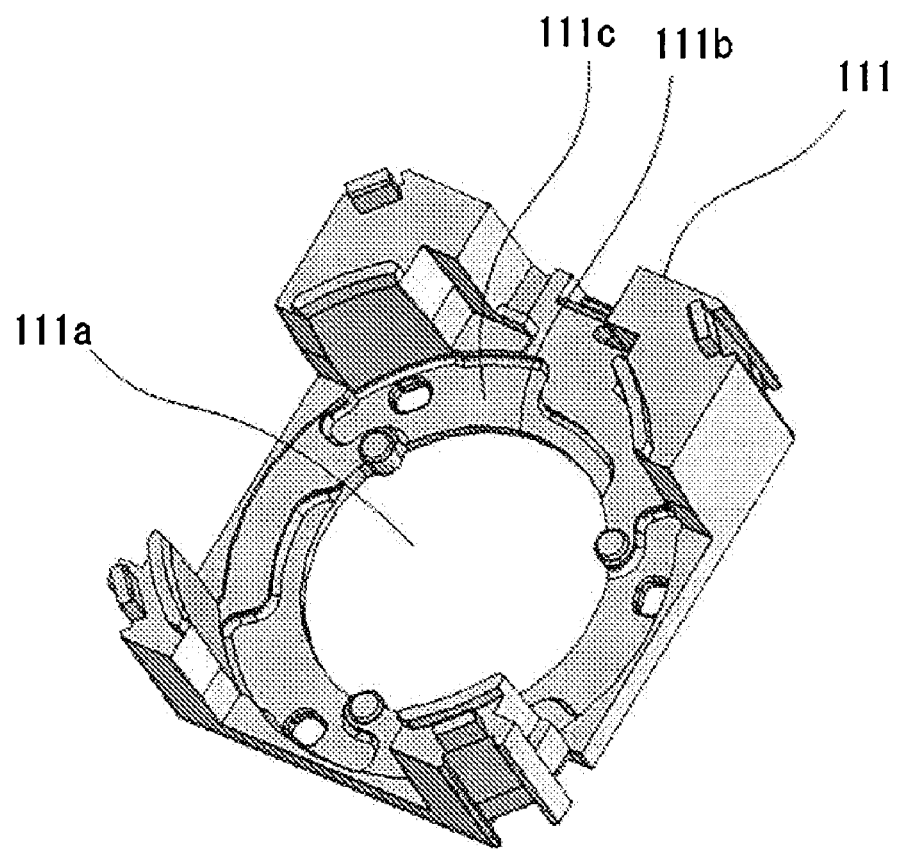
FIG. 4 is an enlarged perspective view of a base 111 of the camera module shown in FIG. 3.

The base 12 is also a molded part made of a synthetic resin containing glass filler as aggregate. As shown in FIGS. 1 and 2, the base has the opening 12a at a center thereof. This opening 12a is provided for introducing light from the lens unit held inside the holder 8 to the imaging element provided below the base 12. Beneath the opening 12a, an upper lid glass (not shown) which is disposed in an imaging area including the imaging element is arranged.

As described above, in the upper surface of the base 12 which faces the cover 2, the concaved dust collecting portion 12c is formed. Further, the surface of the concaved dust collecting portion 12c includes the dust sticking layer 12d. This dust sticking layer 12d is a thin layer made of a synthetic resin, which is formed by applying a synthetic resin having a fixation property and a softening property such as an epoxy-based resin or an acryl-based resin or the like. The dust collecting portion 12c can collect dust fallen onto the upper surface of the base 12 since such dust is stuck to the dust sticking layer 12d. In this regard, it is to be noted that in this embodiment the dust sticking layer 12d is provided over the entire of the upper surface of the base 12.

Further, on the upper surface of the base 12, the dust falling preventing wall 12b is formed so as to surround an entire circumference of the opening 12a of the base 12. As shown in FIGS. 1 and 2, the dust falling preventing wall 12b is a wall protruding toward the cover 2, which acts as a part of the concaved dust collecting portion 12c. Namely, the dust falling preventing wall 12b is a part of a vertical wall which constitutes a concaved portion of the concaved dust collecting portion 12c, and it prevents dust fallen onto the dust collecting portion 12c form being fallen into the opening 12a of the base 12.

According to the camera module of this embodiment described above, when the small-sized electronic apparatuses equipped with the camera module is dropped by an accident, and thereby dust is generated inside the space between the cover 2 and the base 12, there is less possibility that such dust falls on the surface of the upper lid glass disposed in the imaging area of the imaging element. This is because when such dust generated inside the space is fallen onto the upper surface of the base 12, it is possible to prevent such dust from being fallen into the opening 12a due to the dust falling preventing wall 12b, and further such dust is stuck to the dust sticking layer 12d provided on the surface of the concaved dust collecting portion 12c. Therefore, even in the event that the small-sized electronic apparatuses equipped with the camera module is dropped by an accident and thus dust is generated inside the camera module, it is possible to obtain a clear image.

Further, in the camera module of this embodiment, since the dust sticking layer 12d is formed from a thin layer made of an epoxy-based resin or an acryl-based resin or the like, it is possible to collect such dust fallen onto the upper surface of the base 12 by the dust collecting portion 12c reliably, thereby enabling to prevent such dust from being fallen into the opening 12a of the base 12.

In the above description, it is to be noted that the shapes and located areas of the dust collecting portion 12c and the dust falling preventing wall 12b of this embodiment is mere one example, and it is also possible to change them into other shapes according to shapes of the base and the like.

Finally, it is also to be understood that the present disclosure relates to subject matter contained in Japanese Patent Application No. 2006-2943032 (filed on Oct. 30, 2006) which is expressly incorporated herein by reference in its entirety.

What is claimed is:

1. A camera module, comprising:
a lens unit which constitutes an optical system of the camera module;
a holder which has a hollow cylindrical portion that houses the lens unit therein and is displaceable along an optical axis direction of the lens unit;
a coil having a cylindrical form and provided around the cylindrical portion of the holder;
a yoke and magnets provided on the yoke for providing a magnetic field to the coil;
upper and lower leaf springs for supporting the holder so that the holder is displaceable along an optical axis direction of the lens unit;
a base which supports the yoke, and has an opening at a center thereof;
a cover attached to the base so as to define a space therebetween in which the holder 8 can be displaced; and
an imaging element provided below the base,
wherein the base has an upper surface which faces the cover, and the upper surface of the base includes a concaved dust collecting portion and a dust falling preventing wall formed on the upper surface so as to surround an entire circumference of the opening of the base, and wherein a surface of the concaved dust collecting portion includes a dust sticking layer to which fallen dust is adapted to stick, whereby when dust is generated in the space between the cover and the base and such dust is fallen onto the upper surface of the base, it is possible to prevent such dust from entering into the opening due to the dust falling preventing wall and such dust is stuck to the dust sticking layer of the dust collecting portion provided on the upper surface of the base.

2. The camera module as claimed in claim 1, wherein the dust sticking layer of the dust collecting portion provided in the upper surface of the base includes a thin layer made of an epoxy-based resin or an acryl-based resin.

* * * * *